United States Patent
Van Steijn et al.

(10) Patent No.: US 12,433,317 B2
(45) Date of Patent: Oct. 7, 2025

(54) CELL FOR MAKING AN ANISOTROPIC-STRUCTURED PRODUCT FROM A STARTING MATERIAL WHEN BEING SUBJECTED TO A SHEAR FORCE AND HEATED AND A METHOD

(71) Applicant: Wageningen Universiteit, Wageningen (NL)

(72) Inventors: Aloysius Christianus Maria Van Steijn, Oostzaan (NL); Willem Cornelis Steenbergen, Oostzaan (NL); Atze Jan Van Der Goot, Ede (NL)

(73) Assignee: Wageningen Universiteit, Wageningen (NL)

( * ) Notice: Subject to any disclaimer, the term of this patent is extended or adjusted under 35 U.S.C. 154(b) by 539 days.

(21) Appl. No.: 17/780,244

(22) PCT Filed: Nov. 27, 2020

(86) PCT No.: PCT/NL2020/050744
§ 371 (c)(1),
(2) Date: May 26, 2022

(87) PCT Pub. No.: WO2021/107778
PCT Pub. Date: Jun. 3, 2021

(65) Prior Publication Data
US 2022/0408782 A1    Dec. 29, 2022

(30) Foreign Application Priority Data
Nov. 27, 2019  (NL) .................................... 2024317

(51) Int. Cl.
*A23P 30/00*    (2016.01)
*A23J 3/08*     (2006.01)
(Continued)

(52) U.S. Cl.
CPC ................. *A23P 30/00* (2016.08); *A23J 3/08* (2013.01); *A23J 3/14* (2013.01); *A23J 3/22* (2013.01); *A23V 2002/00* (2013.01)

(58) Field of Classification Search
CPC ... A23P 30/00; A23P 10/00; A23J 3/08; A23J 3/14; A23J 3/22; A23J 3/225; A23J 3/227; A23V 2002/00
(Continued)

(56) References Cited

U.S. PATENT DOCUMENTS

2015/0128818 A1* 5/2015 Cheinet ............... A23N 12/083
99/477

FOREIGN PATENT DOCUMENTS

EP    0250623 A1    1/1988
EP    2250906 A1    11/2010
(Continued)

OTHER PUBLICATIONS

Krintiras et al, Journal of Food Engineering, 169 (2016) 205-213.
(Continued)

*Primary Examiner* — Huy Tram Nguyen
(74) *Attorney, Agent, or Firm* — Banner & Witcoff, Ltd.

(57) ABSTRACT

A cell (100) for making an anisotropic-structured product from a protein starting material, the cell (100) comprising an inner member (110) and an outer member (120) arranged concentrically along a longitudinal axis (180) to define together a chamber (150) for holding the starting material, wherein the inner member (110) and the outer member (120) are rotatable relative each other about the longitudinal axis (180) for providing the shear force to the starting material and wherein both the inner member (110) and the outer member (120) further define for the cell an inner longitudinal surface (114) and an outer longitudinal surface (124) facing away the chamber (150) such that a normal of each
(Continued)

longitudinal surface is transverse to the longitudinal axis (180) characterized in that both members are designed to be exposed to the ambient for allowing a heat exchange between both the inner longitudinal surface (114) and the outer longitudinal surface (124) with the ambient to heat the chamber (150).

17 Claims, 5 Drawing Sheets

(51) Int. Cl.
     *A23J 3/14*         (2006.01)
     *A23J 3/22*         (2006.01)

(58) Field of Classification Search
     USPC .......................................................... 422/209
     See application file for complete search history.

(56) References Cited

FOREIGN PATENT DOCUMENTS

| | | |
|---|---|---|
| WO | 02/36086 A1 | 5/2002 |
| WO | 2017012625 A1 | 1/2017 |

OTHER PUBLICATIONS

International Search Report and Written Opinion—PCT/NL2020/050744—mailing date Mar. 11, 2021.

\* cited by examiner

CELL FOR MAKING AN ANISOTROPIC-STRUCTURED PRODUCT FROM A STARTING MATERIAL WHEN BEING SUBJECTED TO A SHEAR FORCE AND HEATED AND A METHOD

CROSS-REFERENCE TO RELATED APPLICATIONS

This application is a U.S. National Stage application under 35 U.S.C. § 371 of International Application PCT/NL2020/050744 (published as WO 2021/107778 A1), filed Nov. 27, 2020, which claims the benefit of priority to Application NL 2024317, filed Nov. 27, 2019. Benefit of the filing date of these prior applications is hereby claimed. Each of these prior applications is hereby incorporated by reference in its entirety.

The present invention relates to a cell for making an anisotropic-structured product from a protein starting material, such as a plant-protein starting material and/or a dairy protein and/or an animal-protein, when being subjected to a shear force and heated, the cell comprising an inner member and an outer member arranged concentrically along a longitudinal axis to define together a chamber for holding the starting material, wherein the inner member and the outer member are rotatable relative each other about the longitudinal axis for providing the shear force to the starting material and wherein both the inner member and the outer member further define for the cell an inner longitudinal surface and an outer longitudinal surface facing away the chamber such that a normal of each longitudinal surface is transverse to the longitudinal axis.

Cells for making an anisotropic-structured product are known in the art. For instance, a paper published in the Journal of Food Engineering, 169 (2016) 205-213 discloses a cell used for making a fibrous structure or layered-like structure that mimics the one present in meat by subjecting the protein starting material to shear forces and heat. Such fibrous structure or layered-like structure, also known as anisotropic structure, are obtained by alignment of the protein during the process.

The starting material held in the chamber is subjected to shear forces by rotation of one of the members relative to the other. Since the starting material must be heated in the process, each of the members further comprises an independent heating jacket for feeding steam at high pressure provided by a single source by means of a manifold.

A problem of the prior art is that the presence of jackets does not allow for the use of the cell in a flexible process, especially when the process is scaled up and/or carried out continuously by means of a plurality of cells.

It is an object of the invention to provide a cell that allows for a more cost-effective method, especially when said method is scaled up and/or carried out continuously. To this end, a cell according to the preamble of claim 1 is characterized in that both inner and outer members are designed to be exposed to the ambient for allowing a heat exchange between both the inner longitudinal surface and the outer longitudinal surface with the ambient to heat the chamber. In this way, there is no need to arrange heating jackets, so a much simpler design of cell can be provided, which decreases manufacturing costs. Further, there is no need of providing a manifold, which simplify the design for heating the inner member and the outer member and allows for a much flexible method when a plurality of cells is used in a continuous process.

External heat is used for heating the chamber via the inner longitudinal surface and the outer longitudinal surface. The external heat can be provided for example via a hot air or hot steam or a combination thereof, e.g. via an oven where the cell is placed within or via an indirect heat exchanger comprising the heater and further comprising means for flowing the resulting hot air or hot steam or the combination thereof to the longitudinal surfaces of the members. This simpler design of the cell allows therefore for scaling up and/or a continuous process which are more cost-effective as only one heater is required even when a plurality of cells is used in a method.

It is preferred that at least one of the inner longitudinal surface and the outer longitudinal surface of the cell is designed such that air can flow along the longitudinal of the inner member and the outer member respectively. More preferably, the cell is designed such that an air flow can be directed along all the longitudinal of both members.

In an embodiment, the inner member is designed such that the inner longitudinal surface defines a through-hole for allowing air to flow through the inner member, preferably all along the longitudinal of the cell. For instance, the through-hole is open at the top surface and the bottom surface of said inner member relative to the longitudinal axis for allowing air to flow all along the longitudinal of the cell. In this way, heat exchange is done more efficiently. Moreover, in this way a plurality of cells can be arranged aligned along their longitudinal axes such that hot air can flow all along the plurality of inner members to exchange heat via the inner longitudinal surfaces of said cells in a simple way.

In an embodiment, one member of the cell comprises means for connecting said one member to rotating means. The means may also be designed for connecting said one member to a further member of a further cell such that when the one member of the cell is rotated, the further member of the further cell also rotates.

Preferably, the cell comprises means for connecting the inner member to the rotating means and/or to a further inner member of a further cell. In this way, if a cell is connected to a further cell such that their longitudinal axes are aligned, when the inner member of the cell rotates, the further inner member of the further cell also rotates.

The connecting means may be for example a pinion fixed to one member, such as the inner member, and arranged for connecting said member to an internal gear actuated by motor for rotating said member. The pinion may also be arranged to rotate the member by cooperation with a fixed rack as the cell is being conveyed. The same pinion may be arranged for being adjusted within an internal gear arranged in a further member of a further cell for connecting said cells. Another example of connecting means may be a pin comprising a recess and arranged for connection to a complementary connecting means actuated by a motor or arranged in a further cell.

In an embodiment, the inner member and the outer member are cylindrical. This cell is known in the art as couette cell. They allow for a design easy to manufacture and which allow for an optimal heat exchange.

In an embodiment, the cell can withstand a temperature between 150° C. and 300° C. In this way, the protein starting material can be heated to reach efficiently a temperature between 90° C. and 150° C. in a method.

In an embodiment, the cell further comprises a vacuum-valve for helping to fill the chamber with the starting material by using vacuum. Vacuum can be applied for example by connecting the vacuum valve to a vacuum pump. This is advantageous if the starting material is viscous or semi-solid, speeding up the filling process and reducing the presence of bubbles in the final product.

A second aspect of the invention relates to a system for making a solid product from a material, the system comprising:
- at least one cell;
- means for rotating one member relative to the other member of the at least one cell; and
- a heater, such as an oven, arranged to provide hot air and/or steam to the inner longitudinal surface and the outer longitudinal surface of the cell.

The system allows for a very flexible method, especially when a plurality of cells is provided to a single heater. Only one means may be required for rotating one member relative the other in each cell of the plurality of cells. For example, a fixed rack may be arranged to engage with the connecting means, e.g. a pinion, of one member of a cell. Thus, if a plurality of cells is being continuously conveyed through the oven, each member is arranged to rotate relative to the other member in each cell. In a different example, if the cells of the plurality are connected to each other along their longitudinal axes via the connecting means, one of the members in each cell can be actuated by a single motor.

It is preferred that the means for rotating is arranged to rotate the inner member relative to the outer member of the at least one cell. For example, a support for supporting the outer member of the cell may be used to prevent rotation of the outer member when the inner member is connected to the rotation means. In a different embodiment, the oven may comprise anchoring means for anchoring the outer member to it. Also, the outer member can be arranged such that its outer longitudinal surface, not being cylindrical, fits the interior of the oven designed such as to prevent rotation.

In an embodiment, the system further comprises means for flowing air heated by the heater along the inner longitudinal surface and the outer longitudinal surface of the cell. Thus, the heat exchange is done more efficiently, also when a plurality of cells is used. It is preferred that the inner member is designed such that the inner longitudinal surface defines a through-hole, preferably all along the longitudinal of the cell. Moreover, if a plurality of cells is connected, e.g. via connecting means, the means may flow hot air all along all the inner longitudinal surfaces.

A third aspect of the invention relates to a method for making a solid material having an anisotropic structure, the method comprising the steps of:
- providing at least one cell;
- filling the chamber of the cell with a protein starting material, such as a plant-protein starting material;
- subjecting the protein starting material to a shear force by rotating the inner member relative to the outer member or vice versa; and
- heating the chamber of the cell by providing hot air to the inner longitudinal surface and the outer longitudinal surface.

The protein starting material may comprise for example at least one dairy protein and/or a plant-protein and/or an animal-protein, such as a mixture of Soy Protein Isolate, gluten and water as disclosed in Food Engineering, 169 (2016) 205-213, which mixtures are incorporated by reference. Preferably, the step of heating the chamber in the method is done by circulating hot air all along the inner member and outer member of the cell. Also, heating of the cell is carried out to heat the starting material place in the chamber to a temperature between 90° C. and 150° C.

In an embodiment, the method further comprises a step of cooling down the chamber after having obtained the solid material having an anisotropic structure by providing air to the inner longitudinal surface and the outer longitudinal surface of said cell, the air having a lower temperature than the temperature of the chamber. In this way, the cooling of the final product is done in situ, reducing proliferation of bacteria and, therefore, the spoilage of the final product. This step can be carried out by a refrigerating unit or by the flowing means after the heater has been shut down.

The invention will hereinafter be further elucidated with reference to the drawing of an exemplary embodiment of an apparatus according to the invention that is not limiting as to the appended claims.

Figure 1A:
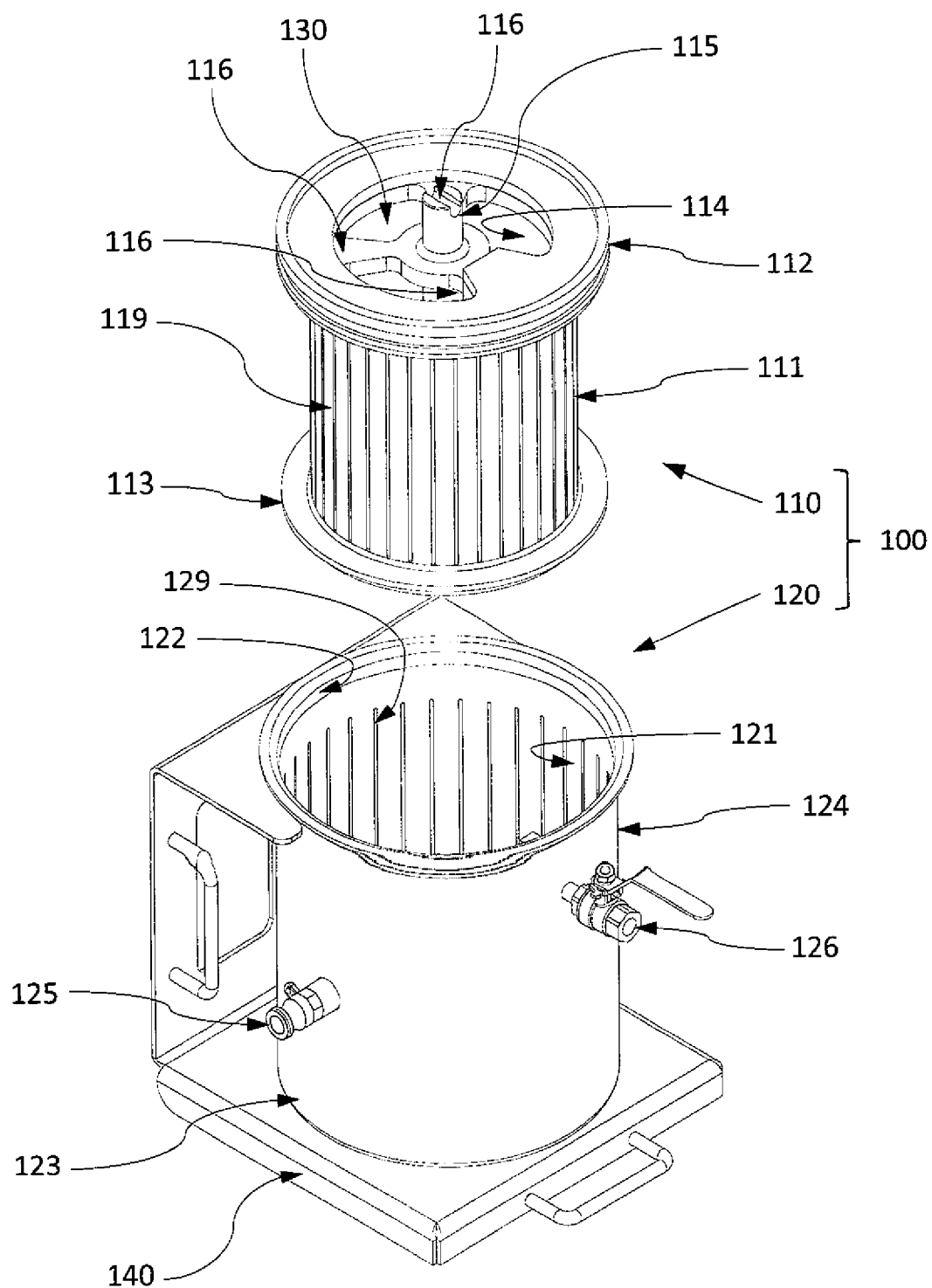
FIG. 1A shows am exploded view of a cell according to the invention
Figure 1B:
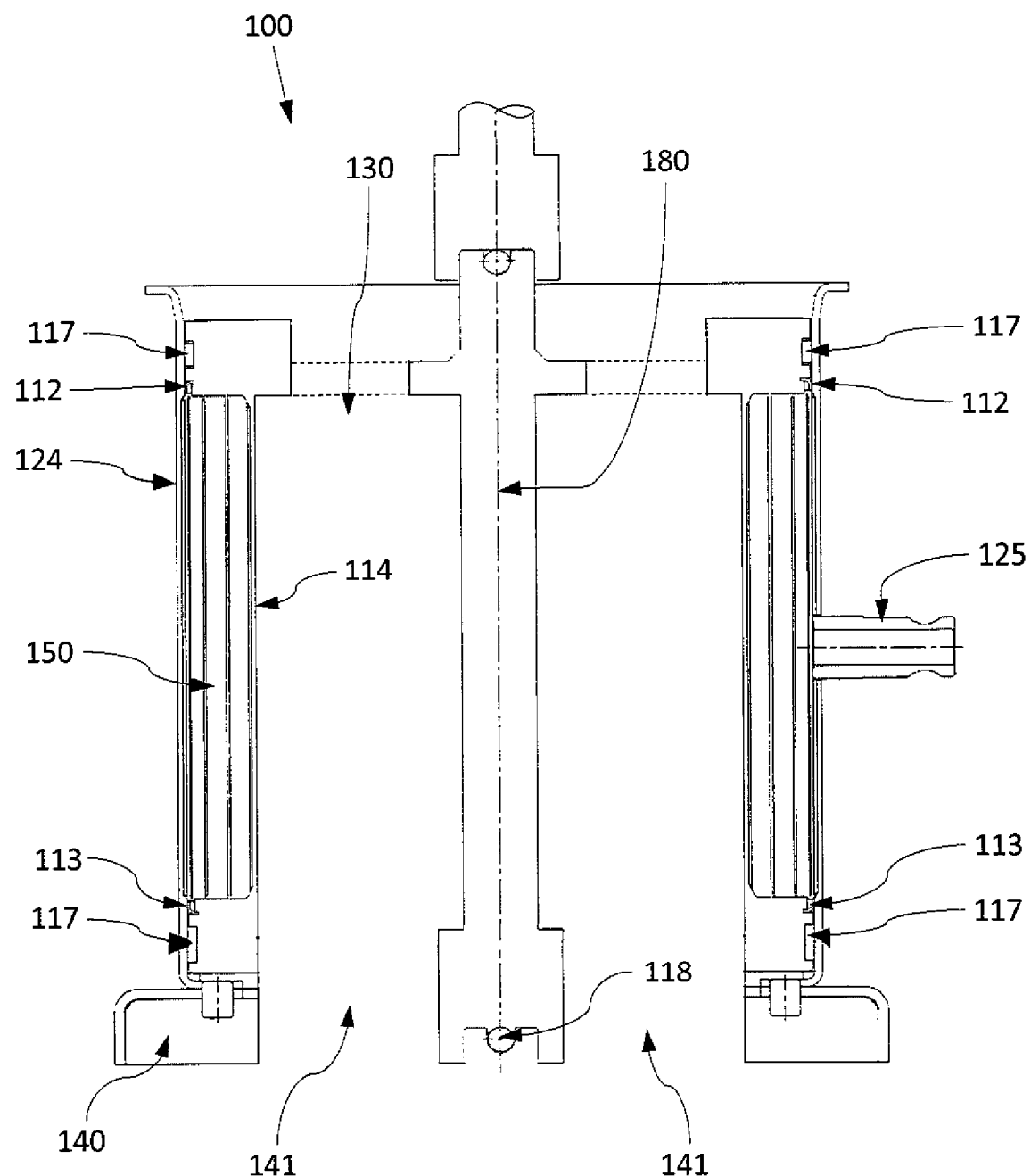
FIG. 1B shows a cross-section of the cell depicted in FIG. 1A
Figure 2:
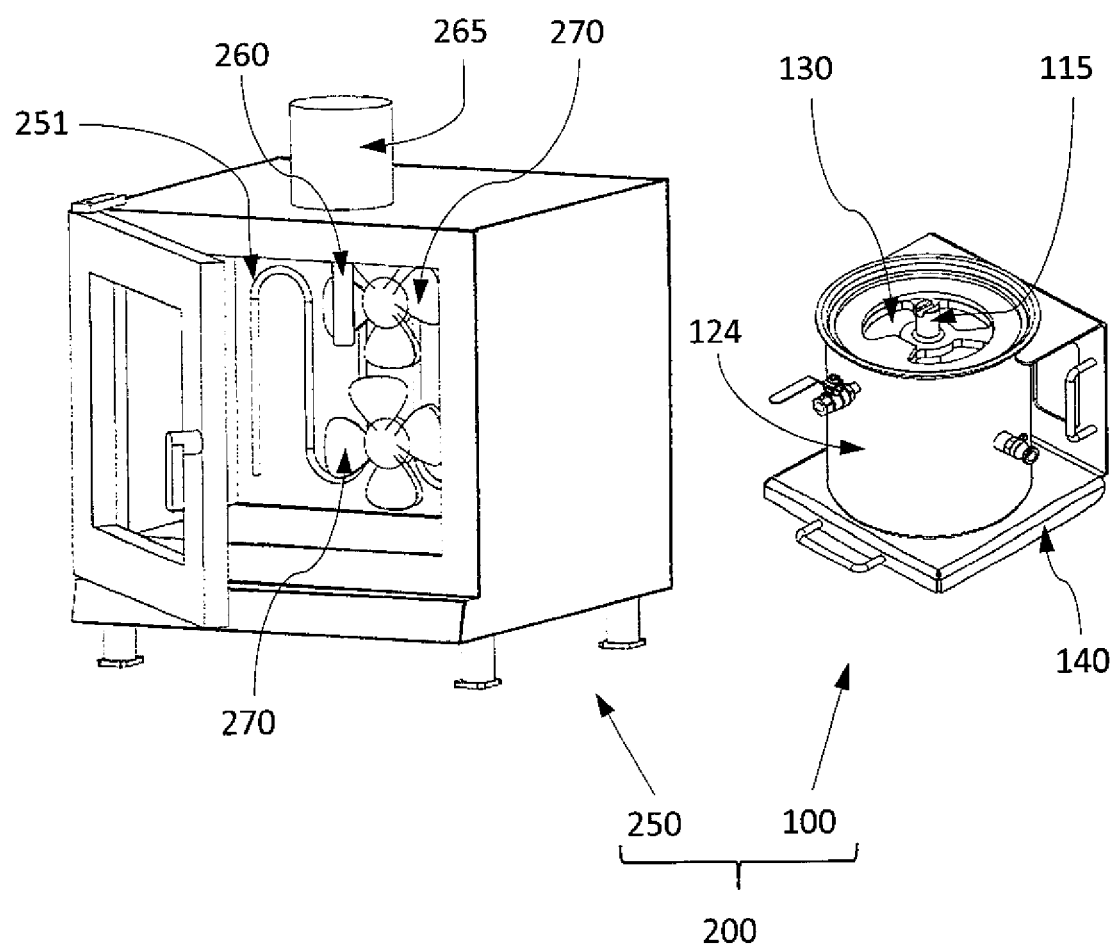
Figure 3:
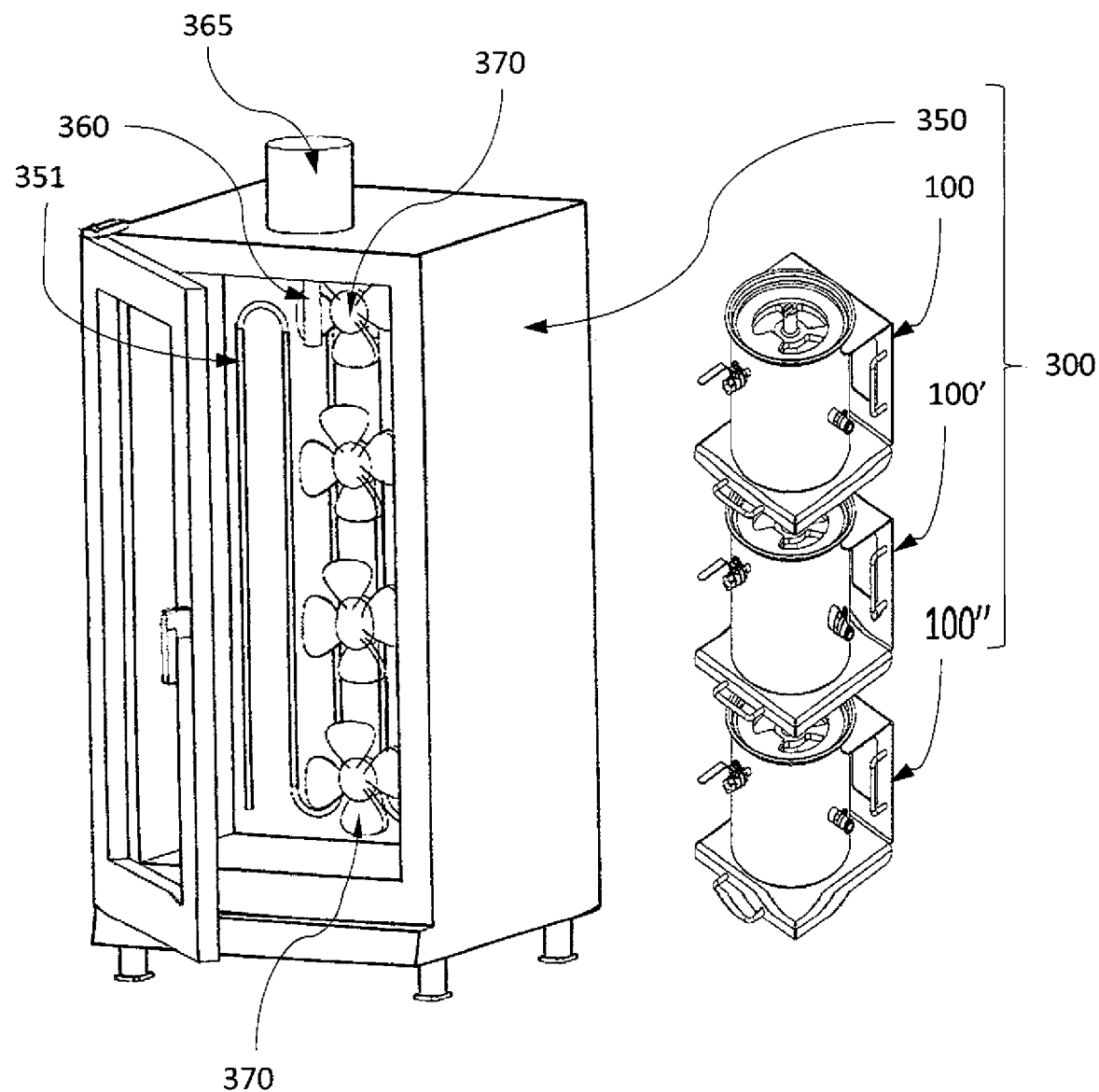
Figure 4:
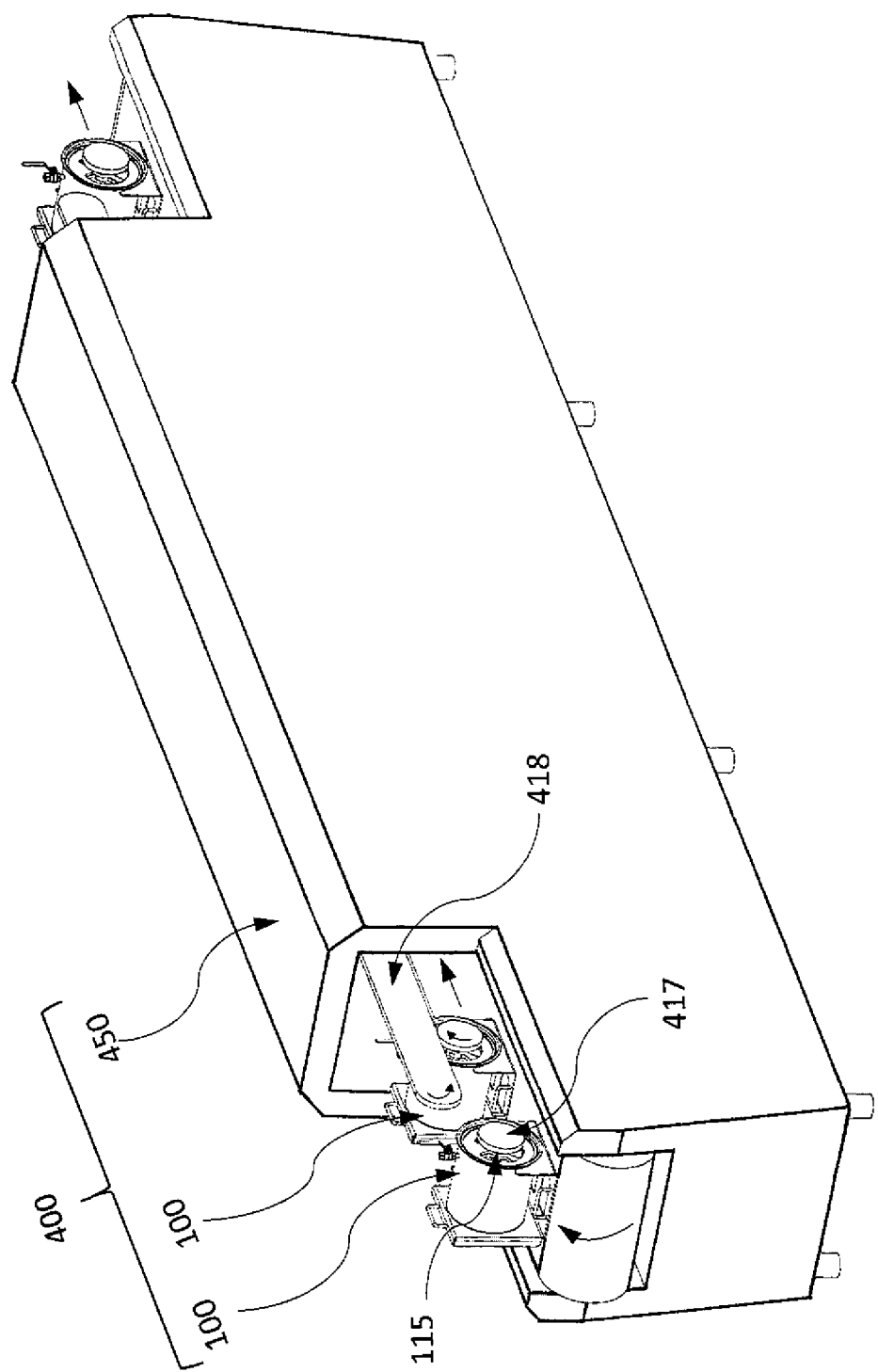

FIG. 2 shows a first example of a system comprising the cell depicted in FIG. 1A FIG. 3 shows a second example of a system comprising a plurality of cells FIG. 4 shows a third example of a system comprising a plurality of cells FIGS. 1A and 1B depict a cell 100 according to the invention. The cell 100 is a couette cell comprising an inner member 110 and an outer member 120.

The inner member 110 is a cylinder made of stainless steel and having an outer longitudinal surface 111 between a top seal 112 and a bottom seal 113 and an inner longitudinal surface 114 defining a through-hole 130 open at the top section and the bottom section of said inner member.

The outer member 120 is also a cylinder made of stainless steel having an inner longitudinal surface 121 between a top section 122 and a bottom section 123, and an outer longitudinal surface 124.

The inner member 110 is arranged within the outer member 120, so the top seal 112 and the bottom seal 113 engages respectively the top section 122 and the bottom section 123. Therefore, both members are concentrically arranged along a longitudinal axis 180.

Rotation of one member relative to the other member is allowed by bearings 117 arranged at the sealings 112 and 113 of the first member 110. Both the inner longitudinal surfaces 111 and 121 comprise respectively grooves 119 and 129 for promoting shear forces when being rotated, as known in the art.

As shown in FIG. 1B, the inner member 110 and outer member 120 define in this arrangement a chamber 150. The outer member 120 comprises at least a feeding valve 125 for feeding starting material into the chamber 150. In a different embodiment the outer member may have more than one feeding valve for filing of different ingredients of the starting material.

The outer member may further comprise a vacuum valve 126 for being connected to a vacuum pump (not shown) such as an Archimedes screw pump or water pump for favoring the filling of the chamber 150 when the starting material is a slurry.

In this arrangement, the longitudinal surfaces of the cell 100 are the inner longitudinal surface 114 of the inner member 110 and the outer longitudinal surface 124 of the outer member 120.

The cell 100 in this example is secured via its outer member 120 to a support 140. As shown in FIG. 1B, the support 140 also defines a passage 141 aligned with the through-hole 130 of the cell 100.

The cell 100 also comprises connecting means for connecting the cell 100 to rotating means and/or to a further cell as will be shown below. These means comprise a male connecting section 115 and a female connecting section 118.

The male connecting section 115 is attached to the top section of the inner member 110 via three arms 116. The female connecting section 118 is attached to the bottom section of the inner member 110 via three arms 116', and it is designed to fit the male connecting section 115.

FIG. 2 depicts a first example of a system 200 for making an anisotropic-structured product from a starting material. The system 200 comprises an oven 250 comprising a heating element 251 arranged therein.

The oven 250 is designed to receive one cell 100. Thanks to the support 140, the outer member is fixed to the interior of the oven 250. However, it is important to note that the cell 100 may be fixed by means other than the support 140, such as for example anchoring means arranged in the oven for connecting engaging means arranged in the outer member 120 (not shown).

When placed within the oven 250, the cell 100 is also connected via the male connecting section 115 to a rotor 260. Since the rotor 260 is actuated by a motor 265, the inner member 110 can be rotated relative to the outer member 120.

The oven also comprises ventilators 270 as means for flowing hot air resulting by the heating element 251 through the through-hole 130 and along the outer longitudinal surface 124. In this way, the chamber 150 comprising the protein starting material may be heated by heat exchange through said longitudinal surfaces.

FIG. 3 depicts a second example of a system 300 for making an anisotropic-structured product from a starting material. This system 300 also comprises an oven 350 comprising a heating element 351, a rotor 360 actuated by a motor 365 and means 370 for flowing hot air heated.

However, in contrast to the system 200, the oven of the system 300 is designed to receive one cell 100, and further cells 100' and 100", all of them having the same design as shown in FIGS. 1A and 1B. Although not shown in FIG. 3, it is understood that the further cell 110" is connected via its male connecting section 115" to the female connecting section 118' of the cell 100'. Similarly, the latter is connected via its male connecting section 115' to the female connecting section 118 of the cell 100.

This arrangement is placed within the oven such that the male connecting section 115 of the cell 100 engages the rotor 360. As the cells 100, 100' and 100" are fixed to the oven 350 thanks to the supports 140, when the inner member 110 is rotated by the motor 365, the further inner members 110' and 110' are also rotated relative to the outer members 120' and 120".

In this arrangement, the through-hole 130 and the further through-holes 130' and 130" are aligned. Thus, the means 370 may also flow hot air heated by the heating element 351 through the through-holes 130, 130' and 130". In this example this is also possible by the cooperation of the openings 141 in the supports 140.

FIG. 4 depicts a third example of a system 400 for making an anisotropic-structured product from a protein starting material. In this system 400, a plurality of cells 100, 100' are conveyed continuously through the oven 450 such that their longitudinal axes are in the horizontal. Although not shown, the oven 450 comprises a heating element and means for flowing hot air heated by said heating element.

The cells 100 are designed as those shown in FIGS. 1A and 1B, although they further comprise a pinion 417 fixed on the male connecting section 115. Thus, as said cells 100 are conveyed, the inner member 110 are rotated by rotation of the pinions 417 via a fixed rack 418 provided in said oven 450.

The invention claimed is:

1. A cell for making an anisotropic-structured product from a protein starting material when being subjected to a shear force and heated, the cell comprising an inner member and an outer member arranged concentrically along a longitudinal axis to define together a chamber for holding the starting material, wherein the inner member and the outer member are rotatable relative each other about the longitudinal axis for providing the shear force to the starting material and wherein both the inner member and the outer member further define for the cell an inner longitudinal surface and an outer longitudinal surface facing away from the chamber such that a normal of each longitudinal surface is transverse to the longitudinal axis, wherein both members are designed to be exposed to the ambient for allowing a heat exchange between both the inner longitudinal surface and the outer longitudinal surface with the ambient to heat the chamber.

2. The cell according claim 1, wherein the inner longitudinal surface defines a through-hole all along the longitudinal of the cell.

3. The cell according to claim 1, wherein one member of the cell comprises connecting means for:
   connecting the one member to rotating means; and/or
   connecting the one member to a further connecting means of a further cell such that when the one member of the cell is rotated, a further member of the further cell also rotates.

4. The cell according to claim 1, wherein the inner member and the outer member are cylindrical.

5. The cell according to claim 1 being designed such that it can withstand a temperature between 150° C. and 300° C.

6. The cell according to claim 1 further comprising a vacuum-valve for helping to fill the chamber with the starting material by applying vacuum.

7. The cell according to claim 2, wherein the through-hole is open at a top surface and a bottom surface of said inner member relative to the longitudinal axis for allowing air from the ambient to flow all along the longitudinal of the cell.

8. A system for making an anisotropic-structured product from a protein starting material, the system comprising:
   at least one cell according to claim 1;
   means for rotating one member relative to the other member of the at least one cell; and
   a heater arranged to provide hot air and/or steam to the inner longitudinal surface and the outer longitudinal surface of the at least one cell.

9. The system according to claim 8, wherein the system further comprises means for flowing hot air and/or steam provided by the heater along the longitudinal of the inner longitudinal surface and the outer longitudinal surface of the at least one cell.

10. The system according to claim 9, wherein the inner longitudinal surface defines a through-hole and the means for flowing hot air and/or steam is arranged for flowing hot air and/or steam through the through-hole along the longitudinal axis of the cell.

11. The system according to claim 8, comprising a further cell being connected to the at least one cell such that by rotation of the one member a further one member of the further cell is also rotated.

12. The system according to claim 11, wherein the system further comprises means for flowing hot air and/or steam provided by the heater along the longitudinal of the inner longitudinal surface and the outer longitudinal surface of the at least one cell, and wherein a further through-hole of an inner member of the further cell is aligned with the through-hole of the inner member of the at least one cell when the further cell and the at least one cell are connected and the means for flowing hot air and/or steam is also arranged for flowing hot air and/or steam through the further through-hole.

13. A method for making a solid material having an anisotropic structure, the method comprising steps of:
   providing at least one cell according to claim 1;
   filling the chamber of the cell with a protein starting material;
   subjecting the starting material to a shear force by rotating the inner member relative to the outer member or by rotating the outer member relative to the inner member; and
   heating the chamber of the at least one cell by providing a flow of hot air and/or steam to the inner longitudinal surface and the outer longitudinal surface.

14. The method according to claim 13, wherein the step of heating the chamber is done by flowing hot air and/or steam all along the inner member and the outer member of the cell.

15. The method according to claim 13, further comprising providing a further cell that is connected to the at least one cell such that by rotation of the inner member or the outer member of the at least one cell a further inner member or further outer member of the further cell is also rotated.

16. The method according to claim 15, wherein a further through-hole of the further inner member of the further cell is aligned with the through-hole of the inner member of the at least one cell when the further cell and the at least one cell are connected and the flow of hot air and/or steam also flows through the further through-hole.

17. The method according to claim 13, further comprising a step of cooling down the chamber after having obtained the solid material having an anisotropic structure by flowing air to the inner longitudinal surface and the outer longitudinal surface of said cell, the air being colder than the temperature of the solid material.

* * * * *